United States Patent
Christofferson et al.

(10) Patent No.: US 11,067,787 B2
(45) Date of Patent: Jul. 20, 2021

(54) MICROSCOPE MOUNTED INFRARED DIGITAL THERMAL IMAGE SYSTEM

(71) Applicant: Microsanj, LLC, Santa Clara, CA (US)

(72) Inventors: James Christofferson, Santa Cruz, CA (US); Dustin Kendig, Fremont, CA (US); Ali Shakouri, West Lafayette, IN (US); Hamid R. Piroozi, Fishers, IN (US)

(73) Assignee: MICROSANJ, LLC, Santa Clara, CA (US)

( * ) Notice: Subject to any disclaimer, the term of this patent is extended or adjusted under 35 U.S.C. 154(b) by 0 days.

(21) Appl. No.: 16/658,091

(22) Filed: Oct. 20, 2019

(65) Prior Publication Data
US 2020/0124838 A1    Apr. 23, 2020

Related U.S. Application Data

(60) Provisional application No. 62/749,523, filed on Oct. 23, 2018.

(51) Int. Cl.
*G02B 21/36*    (2006.01)
*H04N 5/225*    (2006.01)

(52) U.S. Cl.
CPC ......... *G02B 21/365* (2013.01); *H04N 5/2253* (2013.01); *H04N 5/22521* (2018.08)

(58) Field of Classification Search
CPC ............. G02B 21/365; H04N 5/22521; H04N 5/2253; H05B 3/44
See application file for complete search history.

(56) References Cited

U.S. PATENT DOCUMENTS

| | | | | |
|---|---|---|---|---|
| 3,947,084 | A * | 3/1976 | Noyes | G02B 13/14 359/354 |
| 4,317,962 | A * | 3/1982 | Cox | H04Q 11/0407 370/380 |
| 4,833,698 | A * | 5/1989 | Flannery | G01N 23/046 378/19 |
| 5,114,238 | A * | 5/1992 | Sigler | G02B 13/14 359/357 |
| 2002/0018510 | A1* | 2/2002 | Murphy | G01N 25/72 374/45 |
| 2002/0033452 | A1* | 3/2002 | Hoult | G02B 21/361 250/332 |
| 2002/0126732 | A1* | 9/2002 | Shakouri | G01J 5/08 374/130 |
| 2008/0081996 | A1* | 4/2008 | Grenon | A61B 5/411 600/443 |

(Continued)

OTHER PUBLICATIONS

EXAR Corporation, XRD9814/XRD9816, EXAR Corporation (Year: 1999).*

(Continued)

*Primary Examiner* — Joon Kwon

(57) ABSTRACT

An infrared (IR) digital lens (IR Objective) for an optical microscope is disclosed which includes a body, configured to be mounted to an objective interface of an optical microscope, an IR camera disposed in the body, the IR camera configured to receive light in the range of IR and capture images from a specimen disposed under the body without the need to move the specimen from the optical microscope.

22 Claims, 3 Drawing Sheets

(56) References Cited

U.S. PATENT DOCUMENTS

| | | | |
|---|---|---|---|
| 2009/0245322 A1* | 10/2009 | Hudgings | G01M 11/30 374/45 |
| 2009/0297017 A1* | 12/2009 | Hudgings | G06T 7/001 382/141 |
| 2009/0325211 A1* | 12/2009 | Fang | G01N 21/648 435/29 |
| 2012/0188720 A1* | 7/2012 | Okuie | H04N 5/2253 361/704 |
| 2012/0307066 A1* | 12/2012 | De Ieso | G08B 13/19602 348/152 |
| 2013/0155499 A1* | 6/2013 | Dixon | G02B 21/06 359/385 |
| 2014/0333723 A1* | 11/2014 | Dowaki | G01N 21/65 348/46 |
| 2016/0119556 A1* | 4/2016 | Wang | G01J 5/0265 348/33 |
| 2017/0117233 A1* | 4/2017 | Anayama | G02B 21/0016 |
| 2018/0024344 A1* | 1/2018 | Ueda | G02B 21/04 359/363 |
| 2018/0081160 A1* | 3/2018 | Hirose | G02B 21/0012 |
| 2018/0094979 A1* | 4/2018 | Kendig | G01J 3/2823 |

OTHER PUBLICATIONS

Kendig et al, Side-by-side comparison between infrared and thermoreflectance imaging using a thermal test chip with embedded diode temperature sensors, IEEE (Year: 2012).*

* cited by examiner

MICROSCOPE MOUNTED INFRARED DIGITAL THERMAL IMAGE SYSTEM

RELATED APPLICATIONS

The present U.S. patent application is related to U.S. Non-Provisional patent application Ser. No. 15/881,757, filed 27 Jan. 2018; Ser. No. 15/825,025, filed 28 Nov. 2017; and Ser. No. 15/721,980, filed 2 Oct. 2017; and claims priority to U.S. Provisional Patent Application Ser. No. 62/749,523, entitled "MICROSCOPE MOUNTED INFRARED DIGITAL THERMAL IMAGE SYSTEM", the contents of each of which are hereby incorporated by reference in their entirety into the present disclosure.

TECHNICAL FIELD

The present application relates to non-contact infrared (IR) and thermal measurements, and more particularly to an objective for a microscope adapted to generate IR images.

BACKGROUND

This section introduces aspects that may help facilitate a better understanding of the disclosure. Accordingly, these statements are to be read in this light and are not to be understood as admissions about what is or is not prior art.

In a typical microscopy application, a specimen is placed under the visible light optics of a microscope and studied. When there is a need for infrared (IR) measurements, the specimen is moved to a specialized IR-based microscope where an alignment mark or feature is utilized to locate the specimen and then study it accordingly. However, the process of making alignment marks, removing the specimen from a visible light microscope to an IR-based microscope, realignment, and acquisition of IR-based images can be cumbersome. In addition, having to have two sets of microscopes is costly.

There is, therefore, an unmet need for a novel method and system that can interrogate IR signatures of a specimen in a visible light microscope without the challenges presented by the prior art systems.

SUMMARY

An infrared (IR) digital lens (IR Objective) for an optical microscope is disclosed. The IR digital lens includes a body, configured to be mounted to an objective interface of an optical microscope. The IR digital lens also includes an IR camera disposed in the body. The IR camera configured to receive light in the range of IR and capture images from a specimen disposed under the body without the need to move the specimen from the optical microscope.

A method of acquiring infrared (IR) images with an optical microscope is also disclosed. The method includes placing an IR image digital objective into an optical microscope, the IR objective includes a body, configured to be mounted to an objective of an optical microscope. The IR objective also includes an IR camera disposed in the body. The IR camera configured to receive light in the range of IR and capture images from a specimen disposed under the body without the need to move the specimen from the optical microscope. The method also includes obtaining an IR image from the IR objective.

DETAILED DESCRIPTION

Figure 1:
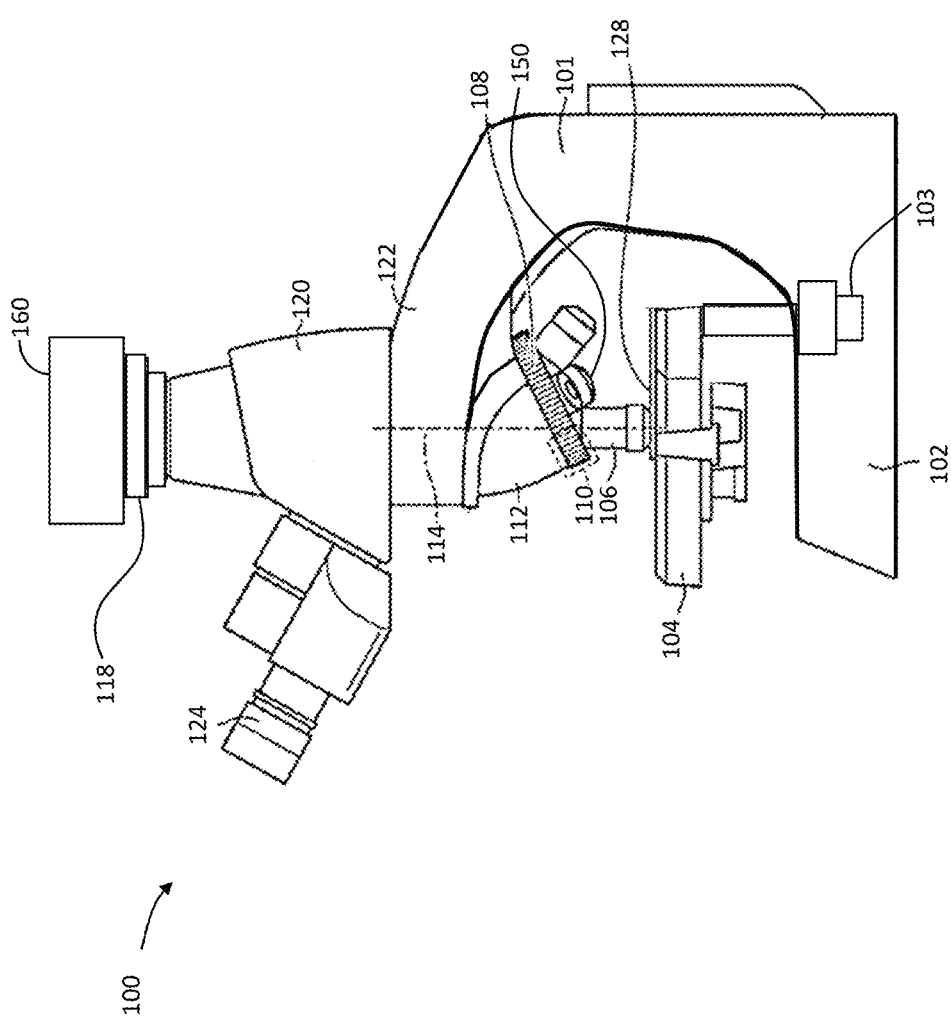
FIG. 1 is a side view schematic of a combined optical/infrared (IR) microscope including an IR objective, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

A new method and system for interrogating infrared (IR) signatures of a specimen under a microscope without the prior-art presented challenges associated with moving the specimen form an optical microscope to an IR microscope is discussed.

Referring to FIG. 1, a side view of a typical microscope 100 is shown. The microscope 100 includes an upright frame 101 terminating to a base 102 on one end and a handle 122 on the other. A staging adjustment 103 allows a user to adjust a stage 104 in both X and Y directions. The microscope 100 also has a vertical adjustment which is not shown. Such an adjustment can bring into focus a sample 128 placed on the stage 104 through an eyepiece 124. A revolving objective set 112 having a plurality of objectives (e.g., 106 and 150) with a dial 108 having a grip surface 110 is attached to the frame 101. By griping the drip surface 110 and turning it, objectives (e.g., 106 and 150) can be brought into a line of sight 114 through a lens barrel 120 adapted to redirect light from the line of sight through the eyepiece 124 or a visible light camera 160 through the port 118. Other adjustments (e.g., coarse and fine adjustments) may also be available and known to a person having ordinary skill in the art, but which are not shown in FIG. 1.

The present disclosure is particularly related to the objective 150 shown in FIG. 1 which is one of the objectives of the microscope 100. The objective 150 includes an infrared (IR) camera system. By adding this small IR camera system to an existing visible microscope it will be possible to diagnose semiconductor faults through heat signature of specific failure modes or any other specimen with an IR signature, without the need to move the specimen from the visual microscope to an IR microscope. The required optics, IR image sensor, as well as digital image processing components are contained in the same space one would normally mount a microscope objective. For example, the system uses a small VOx (Vanadium oxide) microbolometer imaging sensor (e.g., FLIR BOSON) at a prescribed resolution, e.g., 640×480 pixels, combined with a simple biconvex adjustable infrared lens that passes 3-14 micron to achieve an imaging magnification of (0.3× to 4×). This combination provides a wide view up to several centimeters which can provide a zoom-in functionality past the diffraction limit of several microns per pixel. Such a combination further results in a 40 microns/pix (0.3×), 12 microns/pix (1×), and/or 3 micron/pix (4×) resolution (magnification).

Figure 2:
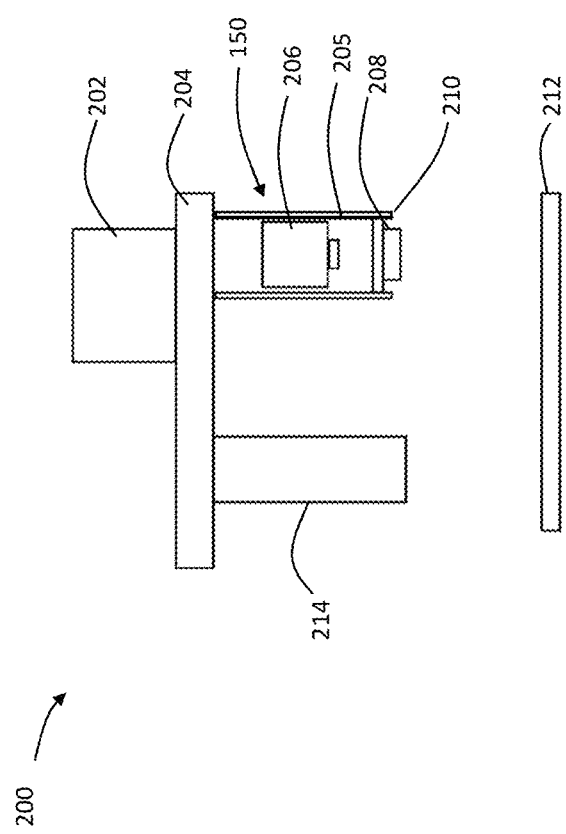
FIG. 2 is a block diagram schematic of an optical/IR microscope, according to the present disclosure.

Referring to FIG. 2, a schematic block diagram for a microscope with combined visual/IR capabilities 200 is provided. The visual/IR microscope 200 can be coupled to a processing system described further below using various connectivity for digital image transfer (e.g., Bluetooth, USB, and/or GiGe) to an off-board computer system further described below. The digital lens of the present disclosure, according to one embodiment can have a 14-bit linearized mode (onboard DSP which can be adapted to calculate a linear thermal image output) or 8-bit raw sensor output, for transfer to the off-board computer for further processing.

As discussed above, an improved method can be implemented using Lock-in Techniques applied to both thermoreflectance (TR) and IR, as well as Image layering using pattern recognition for a combined TR-IR thermal model, and Multi-spectral TR-IR calibration to provide improved accuracy.

The visual/IR microscope 200 as shown in FIG. 2 includes microscope body 202 (provided as a general component but further described with reference to FIG. 1, which includes upright frame 101 terminating to the base 102 on one end and the handle 122 on the other). The microscope 200 also includes a rotatable microscope body 204 similar to the revolving objective set 112 shown in FIG. 1. The IR objective 150 is further shown in FIG. 2 as an assembly which includes a body 205 which is a cylindrical body, disposed within which is an IR image sensor 206. A lens 208 (e.g., a biconvex or other types of lens known to a person having ordinary skill in the art) is positioned at an end of the body 205, adapted to be brought into proximity of a specimen by an adjustable focus mechanism 210 which is similar to the staging adjustment 103 shown in FIG. 1 for X and Y staging. The lens 208 or body 205 can include local temperature control (using, for example, thermoelectric coolers) to improve the signal-to-noise ratio for the IR camera 206. FIG. 2 also shows a sample tray and sample under test 212 which is interrogated under visible light by a non-IR objective 214 first, and then interrogated by the IR objective 150 in order to study its IR signature. Not shown is a digital signal processing (DSP) processor onboard the objective 150 adapted to process data from the IR image sensor 206, or co-process the images along with the processor shown in FIG. 3.

Figure 3:
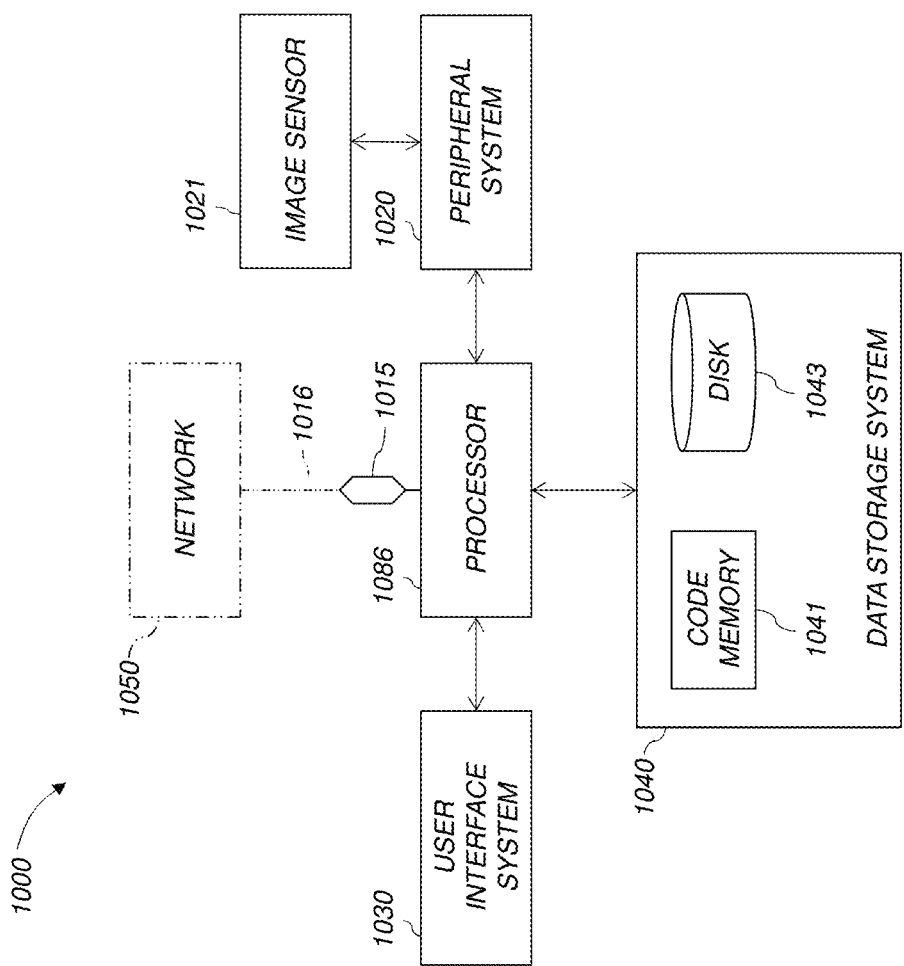
FIG. 3 is a high-level block diagram of a processing system, according to the present disclosure.

Referring to FIG. 3, a high-level diagram showing the components of an exemplary data-processing system 1000 for analyzing data and performing other analyses described herein, and related components. The processing system 1000 is adapted to interface with the IR image sensor 206 to process the images. The system includes a processor 1086 (discussed above), a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015.

The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Those skilled in the art will recognize that numerous modifications can be made to the specific implementations described above. The implementations should not be limited to the particular limitations described. Other implementations may be possible.

The invention claimed is:

1. An optical microscope, comprising:
   an IR objective, configured to be mounted to an objective interface;
   a non-IR objective, configured to be mounted to the objective interface and further configured to receive visible light from a specimen;
   an IR camera disposed in the IR objective; and
   the IR camera configured to receive light in the range of IR and capture images from the specimen disposed under the IR objective while the specimen remains stationary between the non-IR objective receiving visible light and the IR objective receiving IR light.

2. The optical microscope of claim 1, adapted to capture images at 40 microns/pixel.

3. The optical microscope of claim 1, adapted to capture images at 12 microns/pixel.

4. The optical microscope of claim 1, adapted to capture images at 3 micron/pixel.

5. The optical microscope of claim 1, comprising an onboard digital signal processing (DSP) circuit.

6. The optical microscope of claim 5, the DSP circuit adapted to operate at a 14-bit linearized mode.

7. The optical microscope of claim 6, the DSP circuit adapted to generate a linear thermal image output.

8. The optical microscope of claim 1, the IR camera configured to provide an 8-bit raw sensor output.

9. The optical microscope of claim 1, comprising local temperature control of the camera enclosure adapted to improve the signal to noise ratio.

10. The optical microscope of claim 1, further adapted to obtain thermoreflectance (TR) images in addition to IR images.

11. The optical microscope of claim 10, where the IR camera and the thermoreflectance camera can provide multi-spectral IR-TR calibration for improved accuracy.

12. A method of acquiring infrared (IR) images with an optical microscope, comprising:
    placing a non-IR objective on to an objective interface of an optical microscope, the non-IR objective configured to receive visible light from a specimen;
    placing an IR objective configured to be mounted to the objective interface of the optical microscope onto the optical microscope, the IR objective comprising:
    an IR camera disposed in the IR objective;
    the IR camera configured to receive light in the range of IR and capture images from the specimen disposed under the IR objective while the specimen remains stationary between the non-IR objective receiving visible light and the IR objective receiving IR light; and
    obtaining an IR image from the IR objective.

13. The method of claim 12, adapted to capture images at 40 microns/pixel.

14. The method of claim 12, adapted to capture images at 12 microns/pixel.

15. The method of claim 12, adapted to capture images at 3 micron/pixel.

16. The method of claim 12, comprising an onboard digital signal processing (DSP) circuit.

17. The method of claim 16, the DSP circuit adapted to operate at a 14-bit linearized mode.

18. The method of claim 17, the DSP circuit adapted to generate a linear thermal image output.

19. The method of claim 12, the IR camera configured to provide an 8-bit raw sensor output.

20. The method of claim 12, further comprising obtaining thermoreflectance (TR) image in addition to IR images.

21. The method of claim 12, comprising local temperature control of the camera enclosure to improve the signal to noise ratio.

22. The method of claim 20, where the IR camera and the thermoreflectance camera can provide multi-spectral IR-TR calibration for improved accuracy.

* * * * *